(12) United States Patent
Bellec et al.

(10) Patent No.: US 10,622,697 B2
(45) Date of Patent: Apr. 14, 2020

(54) SURFACE WAVE ANTENNA SYSTEM (71) Applicants: TDF, Montrouge (FR); UNIVERSITE DE RENNES 1, Rennes (FR)

(72) Inventors: Mathilde Bellec, La Chapelle des Fougeretz (FR); Franck Colombel, Monfort-sur-Meu (FR); Stéphane M. Avrillon, Rennes (FR); Sébastien Palud, Rennes (FR); Pierre-Yves Jezequel, Thorigné-Fouillard (FR)

(73) Assignees: TDF, Montrouge (FR); UNIVERSITE DE RENNES 1, Rennes (FR)

( * ) Notice: Subject to any disclaimer, the term of this patent is extended or adjusted under 35 U.S.C. 154(b) by 44 days.

(21) Appl. No.: 15/572,192

(22) PCT Filed: May 13, 2016

(86) PCT No.: PCT/FR2016/051151
§ 371 (c)(1),
(2) Date: Nov. 7, 2017

(87) PCT Pub. No.: WO2016/185124
PCT Pub. Date: Nov. 24, 2016

(65) Prior Publication Data
US 2018/0123218 A1    May 3, 2018

(30) Foreign Application Priority Data

May 18, 2015 (FR) ........................ 1554426

(51) Int. Cl.
*H01Q 1/04* (2006.01)
*H01Q 1/48* (2006.01)
(Continued)

(52) U.S. Cl.
CPC .............. *H01Q 1/04* (2013.01); *H01Q 1/48* (2013.01); *H01Q 5/378* (2015.01); *H01Q 5/385* (2015.01);
(Continued)

(58) Field of Classification Search
CPC ............ H01Q 19/26; H01Q 9/30; H01Q 9/32; H01Q 9/34; H01Q 5/385; H01Q 5/378;
(Continued)

(56) References Cited

U.S. PATENT DOCUMENTS 2,008,931 A * 7/1935 Schuler ................ H01Q 1/1242
343/847
2,212,245 A 8/1940 Perroux
(Continued)

FOREIGN PATENT DOCUMENTS

JP    H0270104    3/1990

OTHER PUBLICATIONS

Fikioris G et al: "Novel surface-wave antenna", IEE Proceedings: Microwaves, Antennas and Propagation, IEE, Stevenage, Herts, GB, vol. 143, No. 1, Feb. 16, 1996 (Feb. 16, 1996), pp. 1-6, XP006006537, ISSN: 1350-2417, DOI: 10.1049/IP-MAP:19960160.

*Primary Examiner* — Ab Salam Alkassim, Jr.
(74) *Attorney, Agent, or Firm* — Duane Morris LLP; Gregory M. Lefkowitz; Jason M. Nolan (57) ABSTRACT

The invention relates to a surface wave antenna system, comprising at least one antenna that is electrically short in the vertical plane, with vertical or elliptic polarization and emitting a radiation, said antenna being linked to a conducting medium exhibiting a substantially horizontal surface. The antenna system being characterized in that it comprises
(Continued)

furthermore at least one parasitic wire extending in a direction substantially parallel to the surface of the conducting medium, electrically insulated from each antenna, and arranged in the vicinity of at least one antenna in such a way as to be able to radiate by virtue of the current induced by said radiation of this antenna. The invention makes it possible to combine the resultants of each radiating element in such a way as to control the radiation pattern in the vertical plane.

9 Claims, 6 Drawing Sheets

(51) Int. Cl.
  *H01Q 9/32* (2006.01)
  *H01Q 9/34* (2006.01)
  *H01Q 9/38* (2006.01)
  *H01Q 19/32* (2006.01)
  *H01Q 9/36* (2006.01)
  *H01Q 5/378* (2015.01)
  *H01Q 19/26* (2006.01)
  *H01Q 19/22* (2006.01)
  *H01Q 5/385* (2015.01)
  *H01Q 19/00* (2006.01)

(52) U.S. Cl.
  CPC ............... *H01Q 9/32* (2013.01); *H01Q 9/34* (2013.01); *H01Q 9/36* (2013.01); *H01Q 9/38* (2013.01); *H01Q 19/00* (2013.01); *H01Q 19/22* (2013.01); *H01Q 19/26* (2013.01); *H01Q 19/32* (2013.01)

(58) Field of Classification Search
  CPC .. H01Q 5/49; H01Q 9/36; H01Q 9/38; H01Q 19/22; H01Q 19/32; H01Q 1/04; H01Q 1/48
  See application file for complete search history.

(56) References Cited

U.S. PATENT DOCUMENTS

| | | | | |
|---|---|---|---|---|
| 3,289,208 | A | | 11/1966 | Hollingsworth |
| 4,611,214 | A | * | 9/1986 | Campbell .............. H01Q 19/22 343/790 |
| 4,658,266 | A | * | 4/1987 | Doty, Jr. .................. H01Q 9/38 343/829 |
| 5,173,715 | A | * | 12/1992 | Rodal .................. H01Q 21/205 343/795 |
| 5,629,713 | A | | 5/1997 | Mailandt et al. |
| 5,900,842 | A | * | 5/1999 | Coleman ................ H01Q 11/12 343/742 |
| 6,476,766 | B1 | * | 11/2002 | Cohen .................... H01Q 1/243 343/700 MS |
| 6,693,600 | B1 | * | 2/2004 | Elliot ....................... H01Q 1/27 343/715 |
| 7,315,289 | B2 | * | 1/2008 | Puente Baliarda ...... H01Q 1/36 343/817 |
| 7,339,545 | B2 | * | 3/2008 | Su ........................... H01Q 9/36 343/700 MS |
| 9,941,588 | B2 | * | 4/2018 | Desclos ................. H01Q 5/328 |
| 2004/0140944 | A1 | * | 7/2004 | Pennington .............. H01Q 9/40 343/848 |
| 2005/0174297 | A1 | * | 8/2005 | Cake ....................... H01Q 1/38 343/834 |
| 2005/0195124 | A1 | * | 9/2005 | Puente Baliarda ...... H01Q 1/36 343/893 |
| 2005/0237258 | A1 | * | 10/2005 | Abramov ................. H01Q 3/24 343/834 |
| 2006/0103584 | A1 | * | 5/2006 | Su ........................... H01Q 9/36 343/860 |
| 2008/0030406 | A1 | * | 2/2008 | Fortson .................... H01Q 9/32 343/700 MS |
| 2008/0266190 | A1 | * | 10/2008 | Ohba ...................... H01Q 1/243 343/702 |
| 2012/0086603 | A1 | | 4/2012 | Park et al. |
| 2012/0146872 | A1 | | 6/2012 | Chainon et al. |
| 2013/0241790 | A1 | * | 9/2013 | Prioul ...................... H01Q 1/04 343/843 |
| 2016/0197669 | A1 | * | 7/2016 | Babich ............... H04B 7/18504 370/315 |
| 2017/0047665 | A1 | * | 2/2017 | Yang ..................... H01O 19/005 |
| 2019/0165477 | A1 | * | 5/2019 | Bellec ...................... H01Q 1/04 |

* cited by examiner

SURFACE WAVE ANTENNA SYSTEM

CROSS-REFERENCE TO RELATED APPLICATIONS

This application is a § 371 national stage entry of International Application No. PCT/FR2016/051151, filed May 13, 2016, which claims priority to French Patent Application No. 1554426, filed May 18, 2015, the entire contents of which are incorporated herein by reference.

1. TECHNICAL FIELD OF THE INVENTION

The invention relates to an antenna system. In particular, the invention relates to an antenna system having vertical and/or elliptical polarization for transmitting and/or receiving surface waves in a wide frequency band, comprising in particular all or some of the low, medium and high frequencies between approximately 30 kHz and approximately 30 MHz, i.e. low-frequency, medium-frequency and high-frequency waves.

2. TECHNICAL BACKGROUND

Currently, radiating pylons having large dimensions are used to transmit high levels of power in medium-frequency bands. The disadvantage of these pylons is that they are expensive, they require a significant amount of secure land for their installation, and they are not very aesthetically pleasing and are relatively obtrusive. They are not optimized for broadcasting substantially via surface waves.

Antennas using only one surface wave as a propagation vector are very few in number. Current surface-wave systems use whip or biconical antennas, which are not very suitable for radar applications.

Radiating pylons, and generally all antennas having vertical polarization, for example of the whip or biconical kind, substantially generate a space-wave field (also known as ionospheric radiation) and are very expensive, and relatively obtrusive.

A number of solutions have been proposed in order to resolve these problems. FR2965978, filed by the applicant, proposes a solution which makes it possible to significantly reduce the vertical dimensions of the antenna, thus making it possible to reduce installation costs and make the antenna less obtrusive. In addition, the antenna makes it possible to improve surface-wave propagation and to reduce ionospheric radiation. Nevertheless, the ionospheric radiation remains significant, in particular for angles of between ±[20°; 80°] about the normal to the ground plane on which the antenna is arranged. This remaining ionospheric radiation can, in some frequency bands, produce fading phenomena, in particular when surface waves and space waves interfere with one another, in the region of the Earth's surface, after propagation in different media and via different routes.

3. AIMS OF THE INVENTION

The invention aims to overcome at least some of the disadvantages of the known antennas.

In particular, the invention also aims to provide, in at least one embodiment of the invention, an antenna system of which the preferred radiation is surface-wave radiation.

The invention also aims to provide, in at least one embodiment, an antenna system of which the ionospheric radiation is reduced.

The invention also aims to provide, in at least one embodiment, an antenna system that is simple to implement.

The invention also aims to provide, in at least one embodiment, an antenna system which is unobtrusive and of which the vertical dimensions are small.

The invention also aims to provide, in at least one embodiment, an antenna system of which the bandwidth can be easily modified.

The invention also aims to provide, in at least one embodiment, an antenna system of which the surface or horizontal dimensions can be easily reduced.

4. DISCLOSURE OF THE INVENTION

For this purpose, the invention relates to an antenna system for low-frequency, medium-frequency or high-frequency surface waves, comprising:
  at least one antenna which is electrically short in the vertical plane, has vertical or elliptical polarization and emits radiation, said antenna being connected to a conductive medium having a substantially horizontal surface,
the antenna system being characterized in that it further comprises:
  at least one wired parasitic element that is electrically insulated from each antenna and arranged in the vicinity of at least one antenna so as to be able to radiate by virtue of the current induced by said radiation from said antenna, said at least one wired parasitic element advantageously extending in a direction forming an angle of between −10° and 10° with the surface of the conductive medium.

An antenna which is electrically short in the vertical plane is understood to mean an antenna emitting radiation in a preferred wavelength, known as the operating wavelength, and of which the vertical dimensions are less than a quarter of the length of the operating wavelength. If the antenna transmits on a frequency band, the operating wavelength corresponds to the wavelength associated with the central frequency of the frequency band.

An antenna system according to the invention makes it possible to reduce the ionospheric radiation from an antenna by using one or more wired parasitic elements in order to transmit surface waves. The wired parasitic element or parasitic elements are electrically insulated from each antenna, i.e. they are passive elements that are not electrically connected to any antenna. In particular, when the antenna system is in transmission mode, the wired parasitic element or parasitic elements are not connected to the power supply of any antenna.

The parasitic element or parasitic elements radiate solely on account of their position in the vicinity of at least one radiating antenna, by electromagnetic coupling, and said radiation from the parasitic elements makes it possible both to reduce the ionospheric radiation from the antenna system and to increase the directivity of the antenna system in a direction that is substantially parallel to the ground plane and substantially perpendicular to the parasitic element. The parasitic element or parasitic elements extend in a non-vertical direction, i.e. the parasitic elements are not perpendicular to the surface of the conductive medium. The features of the antenna system relating to directivity and to reducing the ionospheric radiation depend on the resonance of the parasitic element or parasitic elements on account of the radiation from the antenna or antennas, this resonance depending on the length of the parasitic element or parasitic elements. It is thus possible to adjust the radiation pattern of the antenna system by selecting the electrical length of the parasitic element or parasitic elements; the parasitic element or parasitic elements are dimensioned such that the radiation from the antenna or antennas and the radiation from the parasitic element or parasitic elements are in antiphase, and are of virtually the same amplitude in order to significantly reduce the radiation in the desired direction. Preferably, the electrical length of the parasitic element or parasitic elements is equal to the operating wavelength at ±20%.

Different types of antenna can be used, for example a shortened whip antenna, or an antenna known as a DAR antenna as described in FR2965978, cited above. The wired parasitic element or parasitic elements therefore improve the performance of said antennas. Furthermore, on account of the small vertical dimensions of the antenna system, said system is unobtrusive, resistant to wind, breezes, lightning, earthquakes and explosions, and it has a small radar echo surface.

The antenna system can be incorporated for example in a high-power transmission system, in particular for broadcasting signals for radio or television programs, or in a reception system.

Preferably, the wired parasitic element extends in a direction that is substantially parallel to the surface of the conductive medium. Substantially parallel is understood to mean an angle between the direction of each parasitic element and the surface of the conductive medium of between −5° and 5°. The wired parasitic element can also be exactly parallel to the surface of the conductive medium.

According to this aspect of the invention, the reduction of the ionospheric radiation and the directivity of the antenna are improved.

The angle between the parasitic element and the surface of the conductive medium is adapted according to the length of the parasitic element such that there is a reduction in the spacing between the portion of the parasitic element that is farthest away from the surface of the conductive medium and the portion of the parasitic element that is closest to the surface of the conductive medium.

Advantageously, the antenna system according to the invention comprises at least two wired parasitic elements extending in main directions that are different from one another.

According to this aspect of the invention, the wired parasitic elements make it possible to reduce the ionospheric radiation in a plurality of radiation-propagation directions.

Advantageously, and according to the invention, at least two wired parasitic elements are electrically connected.

Advantageously, the antenna system according to the invention comprises at least one vertical parasitic element extending in a direction that is substantially perpendicular to the surface of the conductive medium, which element is connected to the conductive medium and is arranged in the vicinity of at least one antenna so as to be able to radiate by virtue of the current induced by said radiation from said antenna.

According to this aspect of the invention, the vertical parasitic element makes it possible to modify the radiation from the antenna, in particular the directivity thereof, and to increase the bandwidth of the antenna system. In the same manner as the wired parasitic element, the vertical parasitic element radiates solely on account of its position in the vicinity of at least one radiating antenna, by electromagnetic coupling.

Advantageously, and according to the invention, at least one vertical parasitic element comprises at least one localized element that is capable of modifying the electrical length of the parasitic element.

According to this aspect of the invention, the localized elements, which can be resistive, capacitive or inductive elements, make it possible to reproduce the RLC resonance of the parasitic element so as to have a reduced physical length of the parasitic element, but an equivalent electrical length.

The localized elements can also make it possible to form open (or high impedance) circuits or closed circuits on the vertical parasitic element or elements according to the operating frequencies, thus forming current traps. The localized elements are thus capable of generating multiple resonances by means of current traps.

Advantageously, and according to the invention, the conductive medium comprises a ground plane, to which each antenna is connected.

According to this aspect of the invention, the ground plane makes it possible to improve the conductivity of the conductive medium if said conductivity is too low.

Advantageously, and according to the invention, at least one wired parasitic element is connected to the conductive medium or, if the conductive medium comprises a ground plane, at least one wired parasitic element is connected to the ground plane.

Advantageously, and according to the invention, at least one parasitic element comprises at least one folded portion.

According to this aspect of the invention, a folded portion makes it possible to reduce the dimensions of the parasitic element, and thus of the antenna system, in order to provide the same electrical length of the parasitic element.

A folded portion can also make it possible, in some embodiments, to increase the bandwidth of the parasitic element in order to obtain radiation patterns that are optimized on a larger frequency band.

Advantageously, and according to the invention, at least one parasitic element comprises at least one localized element.

According to this aspect of the invention, the localized elements, which can be resistive, capacitive or inductive elements, can make it possible to reproduce the RLC resonance of the parasitic element so as to have a reduced physical length of the parasitic element, but an equivalent electrical length. The localized elements are thus capable of modifying the electrical length of the parasitic element.

The localized elements can also make it possible to form open (or high impedance) circuits or closed circuits on the parasitic element or parasitic elements according to the operating frequencies, thus forming current traps. The localized elements are thus capable of generating multiple resonances by means of current traps.

Advantageously, the antenna system according to the invention comprises a plurality of wired parasitic elements that are connected to form a surface parasitic element or a volumetric parasitic element.

According to this aspect of the invention, using a plurality of wired parasitic elements in order to form a surface or volumetric parasitic element makes it possible to increase the bandwidth of the antenna system.

The invention also relates to an antenna system, characterized in combination with all or some of the features mentioned above or below.

5. LIST OF FIGURES

Other aims, features and advantages of the invention will become apparent upon reading the following description, which is given solely in a non-limiting manner and which refers to the accompanying drawings, in which:

FIG. 20 shows a radiation pattern according to an xOz plane of an antenna system according to the embodiment of the invention from FIG. 19a.

6. DETAILED DESCRIPTION OF ONE EMBODIMENT OF THE INVENTION

The following embodiments are examples. Although the description refers to one or more embodiments, this does not necessarily mean that each reference sign relates to the same embodiment, or that the features apply only to one embodiment. Simple features of various embodiments may also be combined in order to provide other embodiments. In the drawings, the scales and proportions are not strictly respected for the sake of illustration and clarity.

An Oxyz orthogonal axis system is used on each figure showing antenna systems according to the various embodiments of the invention.

Figure 1:
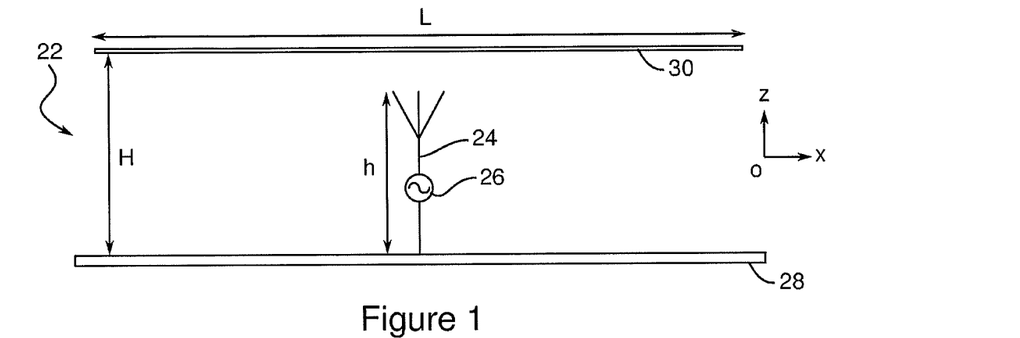
FIG. 1 is a schematic view according to an xOz plane of an antenna system according to a first embodiment of the invention.

FIG. 1 schematically shows, according to an xOz plane, an antenna system 22 according to a first embodiment of the invention.

The antenna system 22 comprises an antenna 24 that is electrically short in the vertical plane, i.e. of which the height h is less than a quarter of the operating wavelength $\lambda_0$ of the antenna 24. Preferably, the height h of the antenna 24 is between $\lambda_0/200$ and $\lambda_0/5$. The antenna 24 can be for example a whip antenna, or an antenna such as that described in FR2965978, filed by the applicant, and hereinafter referred to as the DAR antenna. The antenna is supplied with power by a generator 26, and thus emits low-frequency, medium-frequency or high-frequency radiation, i.e. at an operating frequency of between 30 kHz and 30 MHz, and having vertical or elliptical polarization. The antenna 24 is connected to a conductive medium 28 having a surface that is substantially horizontal, i.e. substantially parallel to the xOy plane of the Oxyz orthogonal axis system. The conductive medium 28 is an imperfect conductive medium, for example earth (soil, sand, etc.) or water (sea, salt marsh, lake, etc.).

The antenna system 22 further comprises a wired parasitic element 30 extending in a direction that is substantially parallel to the surface of the conductive medium 28, in this case parallel to the Ox axis, and to a height H above the conductive medium 28. The height H is generally between $\lambda_0/200$ and $\lambda_0/2$. However, the smaller the height H, the more the antenna system 22 will be unobtrusive and integrated into the landscape in which it is located. The wired parasitic element 30 is linear in this case, and is for example a (single-strand or multi-strand) wire or a conductive tube having a cylindrical or square cross section. The parasitic element 30 is supported by at least one insulating vertical post (not shown), preferably a plurality of insulating vertical posts (not shown) which are evenly distributed along the parasitic element 30 and fastened into the conductive medium 28 if the composition and depth thereof allows it, or said posts float on the conductive medium 28 if said medium consists of water.

The parasitic element 30 is electrically insulated from the antenna and is arranged in the vicinity of the antenna 24 so as to be able to radiate by virtue of the current induced by the radiation from the antenna 24. The parasitic element 30 is of a length L and is dimensioned such that the radiation from the antenna 24 and the radiation from the parasitic element 30 are in antiphase, and are of virtually the same amplitude in order to significantly reduce the radiation in the desired direction. Preferably, as shown, the parasitic element 30 is centered on the antenna 24, the antenna 24 thus being positioned in the region of the medium of the parasitic element 30.

According to other embodiments, the parasitic element 30 can be arranged in any desired manner in the vicinity of the antenna 24 from the moment that said parasitic element can radiate by virtue of the current induced by the radiation from the antenna 24. The length L of the parasitic element 30 is therefore adapted depending on its placement relative to the antenna 24, and generally varies between $0.9\lambda_0$ and several $\lambda_0$. For example, in one embodiment in which the antenna 24 is a DAR antenna where h=0.03$\lambda_0$, the parasitic element 30 has for example a length of L=$\lambda_0$ and is arranged at a height of H=0.033$\lambda_0$.

The obtained antenna system 22 is capable of emitting radiation in low-frequency, medium-frequency and high-frequency waves. The discontinuity between the air and the imperfect conductive medium 28 favors propagation of an omnidirectional or directional ground wave, known as a surface wave. The antenna 24 of the antenna system 22 can originally be an antenna which is intended to transmit surface waves, as with for example the DAR antenna, in which case the addition of the parasitic element 30 in order to form the antenna system 22 results in improved performance of the antenna. The antenna 24 of the system can also not be originally intended to transmit surface waves, in which case the addition of the parasitic element 30 makes it possible to use, for transmitting surface waves, an antenna which was not originally capable of this function. The antenna system can also operate as a signal receiver.

This first embodiment is the simplest of the embodiments of the invention. The embodiments disclosed in the following are improvements on this first embodiment, and the features which have already been described for one embodiment will not be described again for an embodiment comprising these same features.

Figure 2:
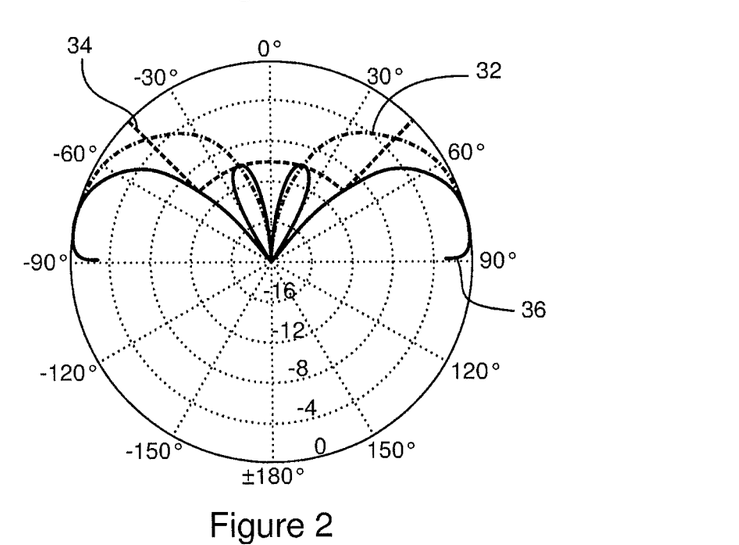
FIG. 2 shows a radiation pattern according to an xOz plane of an antenna system according to the first embodiment of the invention.

FIG. 2 shows a radiation pattern according to an xOz plane of the antenna system according to the first embodiment of the invention.

The pattern comprises three curves; a first curve 32 shows the radiation from a conventional DAR antenna, a second curve 34 shows an outline defining an ionospheric radiation area in which the antenna system should not radiate, and a third curve 36 showing the radiation from the antenna system according to the first embodiment of the invention.

The area defined by the outline indicates that between −45° and 45°, the radiation from the antenna system must not go beyond −10 dB. It can be seen that the DAR antenna radiates in the area defined by the outline and thus does not comply with the limiting constraints of the ionospheric radiation. The antenna system, in particular on account of the addition of parasitic elements, makes it possible to obtain radiation of surface waves that are close to the horizontal plane xOy shown by the axis (−90°; 90°) in the pattern. Furthermore, the ionospheric radiation from the antenna is reduced, and no radiation goes beyond −10 dB in an angle of between −45° and 45°, thus respecting the constraints of the outline. This radiation, the amplitude of which is less than 10 dB relative to the maximum radiation, is known as null radiation.

Figure 3:
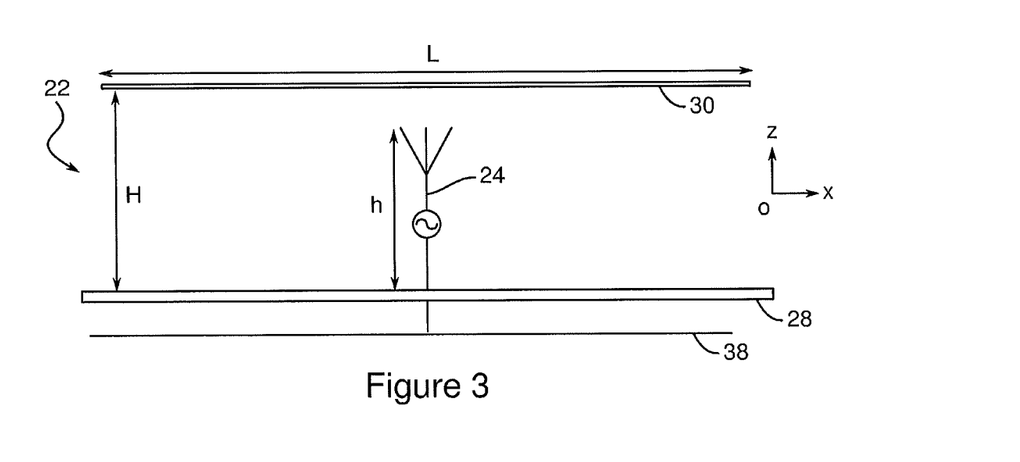
FIG. 3 is a schematic view according to an xOz plane of an antenna system according to a second embodiment of the invention.

FIG. 3 schematically shows, according to an xOz plane, an antenna system 22 according to a second embodiment of the invention.

The conductive medium 28 has electrical conductivity that varies depending on its composition. For example, the sea, salt marshes or salt lakes have high electrical conductivity, and soil and sand have low electrical conductivity. If the electrical conductivity is too low, i.e. less than 1 S/m, the antenna system 22 is supplemented, as in the second embodiment, by a ground plane 38, which is connected to the antenna 24 and is embedded below or on the surface of the conductive medium 28. The ground plane 38 can be made up of a plate, or of a set of conductive wires forming a mesh, etc. The ground plane 38 can have various shapes, for example a circle, a polygon (regular or irregular polygon), etc. The ground plane 38 extends beneath the entirety of the antenna system 22, that is to say the projection of the antenna system 22 onto the conductive medium 28 along the Oz axis is within the surface occupied by the ground plane 38. In practice, in the embodiment shown, the ground plane 38 has a minimum length that is strictly greater than the length L of the parasitic element 30, and a minimum width that is at least several dozen centimeters greater than the width of the parasitic element 30. The heights h and H defined above remain expressed starting from the conductive medium 28.

Figure 4:
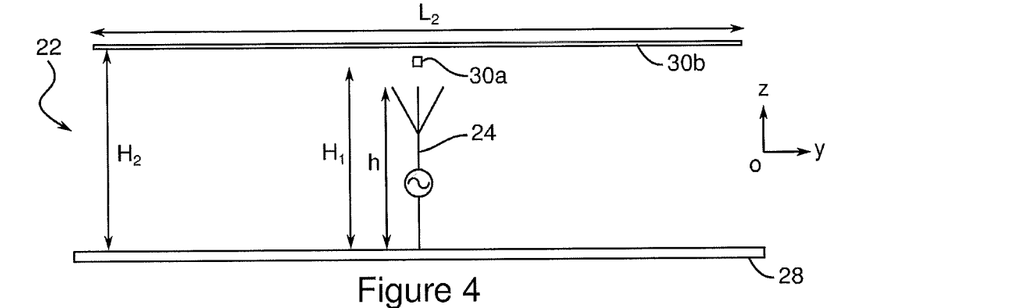
FIG. 4 is a schematic view according to a yOz plane of an antenna system according to a third embodiment of the invention.
Figure 5:
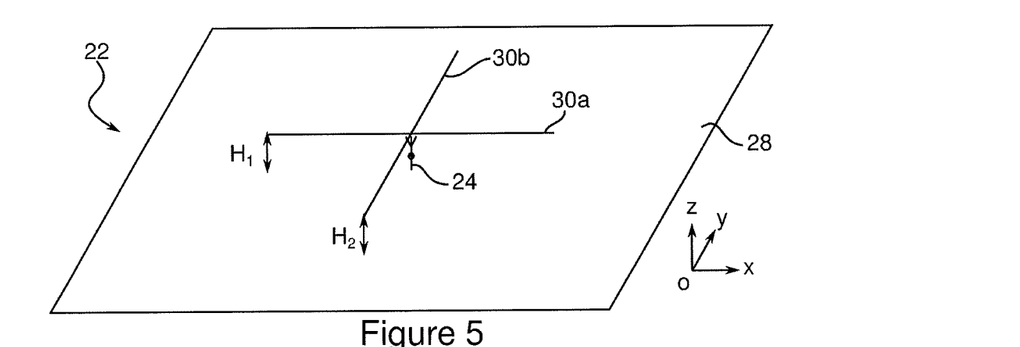
FIG. 5 is a schematic perspective view of an antenna system according to the third embodiment of the invention.

FIG. 4 schematically shows, according to a yOz plane, an antenna system 22 according to a third embodiment of the invention. FIG. 5 is a schematic perspective view of said antenna system 22 according to the third embodiment of the invention.

In this embodiment of the invention, the antenna system 22 comprises a first wired parasitic element 30a, of a length L1, that is identical to the wired parasitic element from the first embodiment, as well as a second wired parasitic element 30b, of a length L2, that is orthogonal to the first wired parasitic element 30a and is positioned thereabove. The second wired parasitic element 30b makes it possible to reduce the ionospheric radiation from the antenna 24 in a different plane from that of the first parasitic element 30a. In particular, the second wired parasitic element 30b is parallel to the Oy axis and thus reduces the ionospheric radiation in the xOz plane. The parasitic elements 30a, 30b are of lengths L1 and L2 which are preferably identical, but they can be of different lengths L1 and L2 in other embodiments. The heights H1 and H2 of the parasites 30a, 30b can be different or identical (in which case the parasitic elements 30a, 30b are electrically connected). The two parasitic elements 30a, 30b are centered on the antenna. The second parasitic element 30b also makes it possible to improve the gain in the region of the ground above the conductive medium 28 and to obtain omnidirectionality of the radiation in the XoY plane, referred to as the azimuthal plane.

According to other embodiments of the antenna system, the two parasitic elements can form any angle that is not 90°, or they can be off-center from the antenna. According to other embodiments of the invention, the two parasitic elements can be electrically connected. According to other embodiments, the antenna system can comprise more than two parasitic elements.

Figure 6:
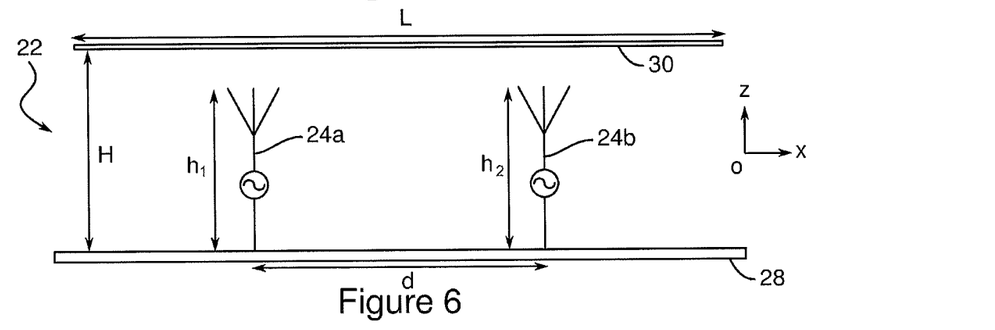
FIG. 6 is a schematic view according to an xOz plane of an antenna system according to a fourth embodiment of the invention.

FIG. 6 schematically shows, according to an xOz plane, an antenna system 22 according to a fourth embodiment of the invention.

In this fourth embodiment, the antenna system 22 comprises two antennas that are connected to the conductive medium 28, a first antenna 24a of a height h1 and a second antenna 24b of a height h2, which are separated by distance d. The antenna system also comprises a single parasitic element 30, arranged so as to radiate by virtue of the radiation from the two antennas 24a, 24b.

The antenna system 22 according to this fourth embodiment makes it possible to modify the radiation from the antennas 24a, 24b by virtue of the parasitic element 30 and of the network theory applied to the two antennas 24a, 24b.

Figure 7:
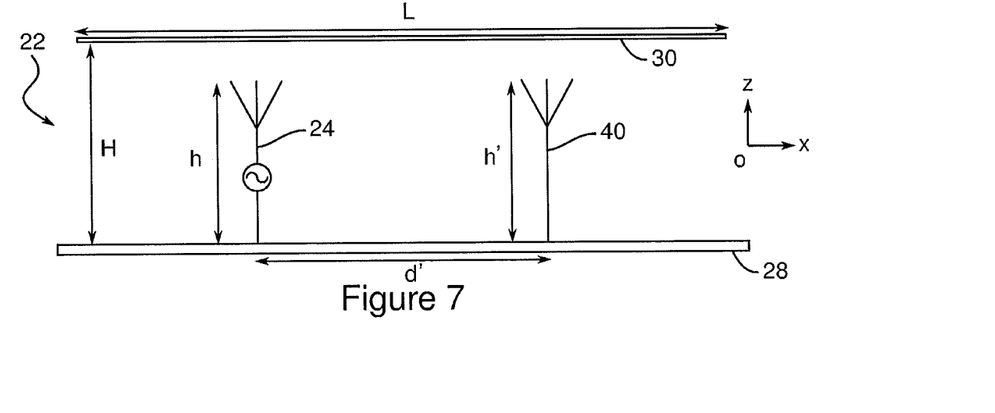
FIG. 7 is a schematic view according to an xOz plane of an antenna system according to a fifth embodiment of the invention.

FIG. 7 schematically shows, according to an xOz plane, an antenna system 22 according to a fifth embodiment of the invention.

In this fifth embodiment, the antenna system 22 comprises a parasitic element 30, an antenna 24 and a vertical parasitic element 40, of a height h' and arranged at distance d' from the antenna 24 so as to radiate by virtue of the current induced by said radiation from the antenna 24. In addition, the parasitic element 40 is connected to the conductive medium 28, or to the ground plane in the embodiments where a ground plane is provided.

In the same manner as the parasitic element 30, the vertical parasitic element 40 radiates on account of its position in the vicinity of the antenna 24, by electromagnetic coupling, and makes it possible to increase the directivity and/or the bandwidth of the antenna system 22. The vertical parasitic element 40 can also have a shape that is similar to the antenna 24 without, however, being supplied with power.

Figure 8:
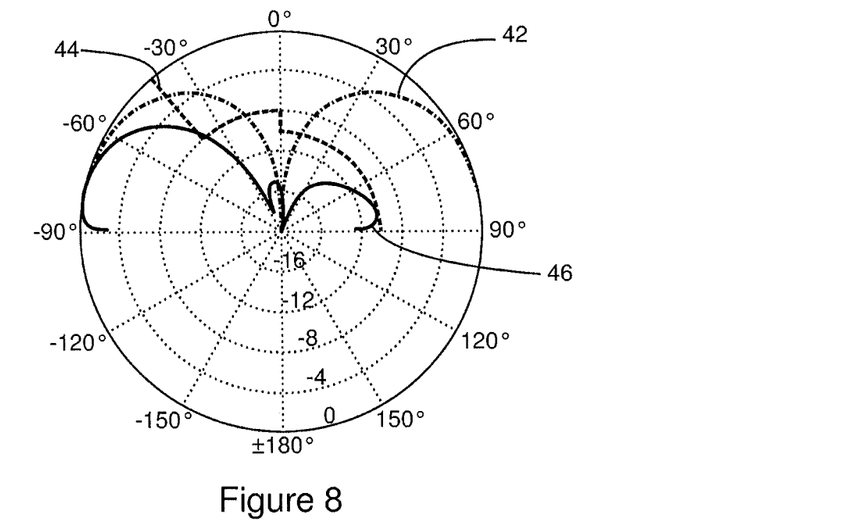
FIG. 8 shows a radiation pattern according to an xOz plane of an antenna system according to the fifth embodiment of the invention.

FIG. 8 schematically shows a radiation pattern according to the xOz plane of an antenna system according to this fifth embodiment.

The pattern comprises three curves; a first curve 42 shows the radiation from a conventional DAR antenna, a second curve 44 shows an outline defining a radiation area in which the antenna system should not radiate, and a third curve 46 showing the radiation from the antenna system according to the fifth embodiment of the invention.

The outline indicates that the amplitude of the radiated field must not go beyond −10 dB between the angles 0° and 90° (on the vertical parasitic element side) and −8 dB between −45° and 0°. The antenna system according to the fifth embodiment makes it possible to respect this outline.

Figure 9:
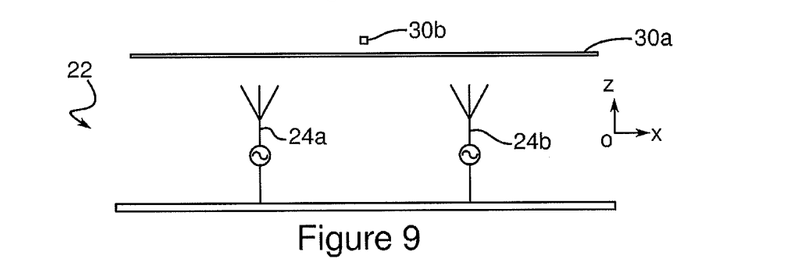
FIG. 9 is a schematic view according to an xOz plane of an antenna system according to a sixth embodiment of the invention.

FIG. 9 schematically shows, according to an xOz plane, an antenna system according to a sixth embodiment of the invention.

This sixth embodiment is a combination of the third and fourth embodiments, the antenna system 22 comprising two parasitic elements 30a, 30b and two antennas 24a, 24b.

Figure 10:
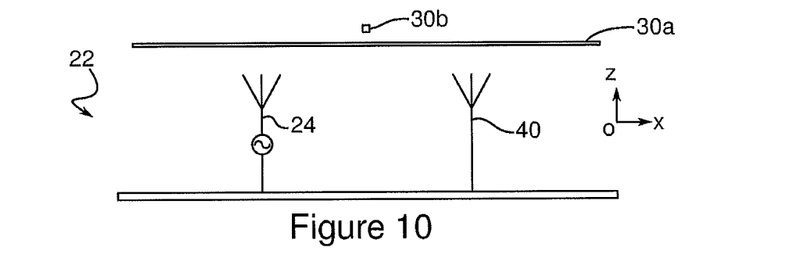
FIG. 10 is a schematic view according to an xOz plane of an antenna system according to a seventh embodiment of the invention.

FIG. 10 schematically shows, according to an xOz plane, an antenna system according to a seventh embodiment of the invention.

This seventh embodiment is a combination of the third and fifth embodiments, the antenna system 22 comprising two parasitic elements 30a, 30b, an antenna 24 and a vertical parasitic element 40.

Figure 11:
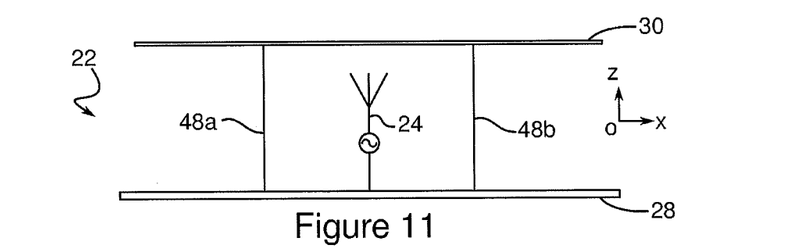
FIG. 11 is a schematic view according to an xOz plane of an antenna system according to an eighth embodiment of the invention.

FIG. 11 schematically shows, according to an xOz plane, an antenna system according to an eighth embodiment of the invention.

In this eighth embodiment, the antenna system 22 comprises an antenna 24 and a parasitic element 30, the parasitic element 30 being electrically connected to the continuous medium 28 by vertical connectors, in this case two vertical connectors 48a and 48b, that are arranged symmetrically on either side of the antenna. The connectors 48a, 48b are connected in the region of the parasitic element 30 in positions in which the current distribution is at a maximum across the parasitic element 30. For example, for a parasitic element of a length of $\lambda_0$, the connectors 48a, 48b are connected in positions corresponding to a distance of $\lambda_0/4$ and $3\lambda_0/4$ starting from one of the parasitic element ends.

Figure 12:
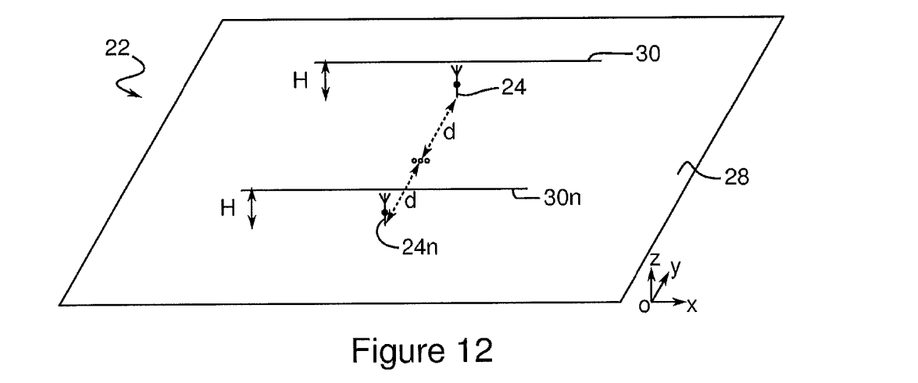
FIG. 12 is a schematic perspective view of an antenna system according to a ninth embodiment of the invention.

FIG. 12 schematically shows a perspective view of an antenna system 22 according to a ninth embodiment of the invention.

In this ninth embodiment of the invention, the antenna system 22 is a network of a plurality of antenna systems according to the embodiments described above, for example according to the first embodiment. The antenna system 22 thus comprises n antennas 24-24n that are connected to the conductive medium 28 and n parasitic elements 30-30n, each parasitic element being arranged in the vicinity of one antenna. The antennas are at a distance d from one another.

Figure 13:
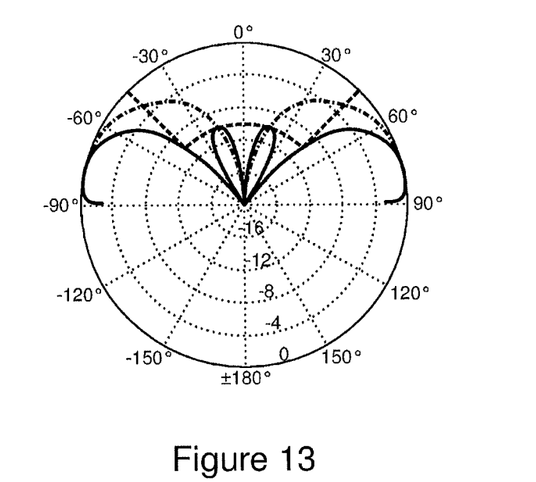
FIG. 13 shows a radiation pattern according to an xOz plane of an antenna system according to the ninth embodiment of the invention.
Figure 14:
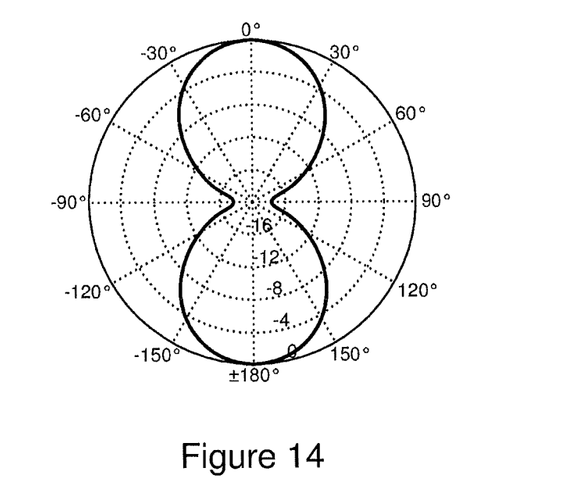
FIG. 14 shows a radiation pattern according to an xOy plane of an antenna system according to the ninth embodiment of the invention.

FIGS. 13 and 14 show radiation patterns of an antenna system according to the ninth embodiment of the invention, comprising three whip antennas of a height h=0.06 $\lambda_0$m, which antennas are associated with three parasitic elements of a length L=1.6$\lambda_0$ m and placed at a height H=0.066$\lambda_0$ m.

The antennas are at a distance d=0.35$\lambda_0$. In order to obtain a bidirectional pattern, as can be seen in FIG. 14 showing the radiation in the xOy plane, the amplitude of the antenna positioned between the two other antennas is equal to 0.6 times the amplitude of said other antennas. The radiation in the xOz plane, which can be seen in FIG. 13, is similar to the radiation described with reference to FIG. 2.

Figure 15:
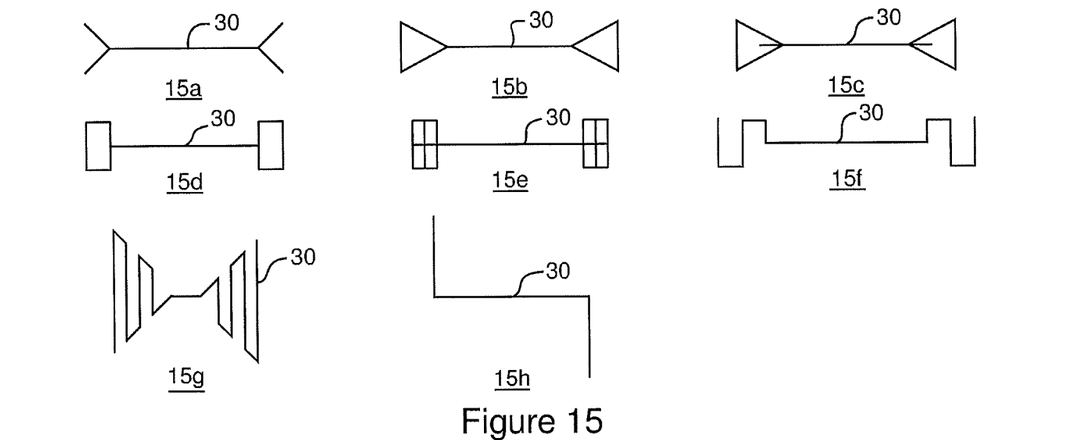
FIGS. 15a, 15b, 15c, 15d, 15e, 15f, 15g and 15h are schematic views according to an xOy plane of wired parasitic elements according to various embodiments of the invention.

FIG. 15 brings together a set of FIGS. 15a, 15b, 15c, 15d, 15e, 15f, 15g and 15h, showing, according to the xOy plane, various embodiments of wired parasitic elements 30 which can be used in an antenna system according to the invention. These parasitic elements comprise, on each of the ends thereof, a folded portion which makes it possible in particular to reduce the dimensions of the parasitic element, in the main direction thereof, with respect to a rectilinear wired parasitic element, while at the same time maintaining an electrical length that is equivalent to this rectilinear wired parasitic element. The electrical length of a parasitic element is the length of the longest current path on the parasitic element.

The parasitic elements can comprise folded portions having different forms, such as meanders, windings, and various geometric shapes. The resulting dimensions can reach 65% of the dimensions of an equivalent rectilinear parasitic element, while at the same time maintaining an equivalent electrical length.

Figure 16:
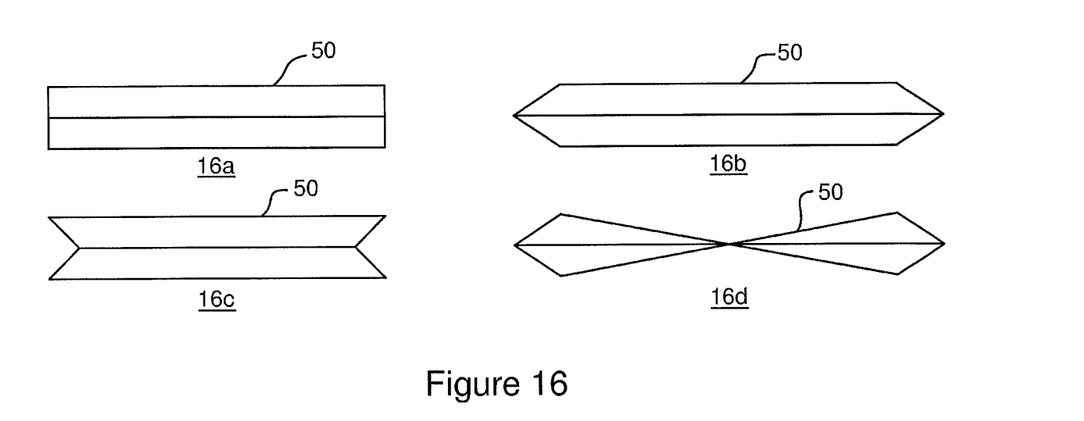
FIGS. 16a, 16b, 16c and 16d are schematic views according to an xOy plane of surface parasitic elements according to various embodiments of the invention.
Figure 17:
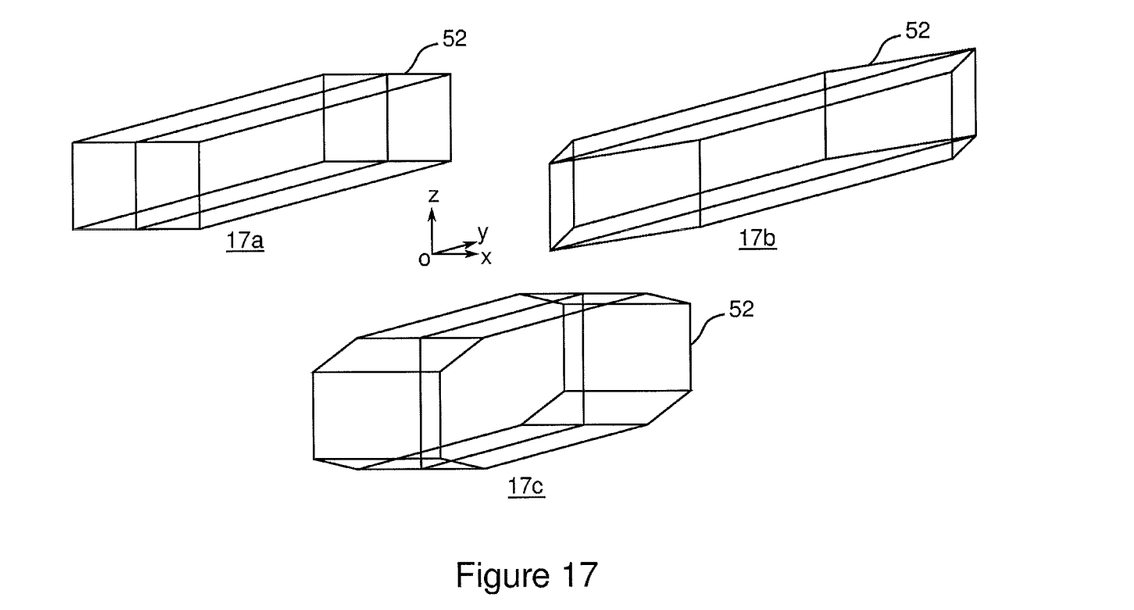
FIGS. 17a, 17b and 17c are schematic views according to an xOy plane of volumetric parasitic elements according to various embodiments of the invention.

FIG. 16 brings together a set of FIGS. 16a, 16b, 16c and 16d showing, according to an xOy plane, various embodiments of a plurality of wired parasitic elements forming a parasitic element known as a surface parasitic element 50. The surface parasitic elements make it possible to increase the bandwidth of the antenna. In the same manner, as shown in a perspective view in FIG. 17 bringing together a set of FIGS. 17a, 17b and 17c, a plurality of wired parasitic elements can be connected to form a parasitic element known as a volumetric parasitic element 52 in order to increase the bandwidth of the antenna. The shapes of the surface or volumetric parasitic elements can vary so as to reduce the width/length ratio of these parasitic elements in order to further increase the bandwidth.

Figure 18:
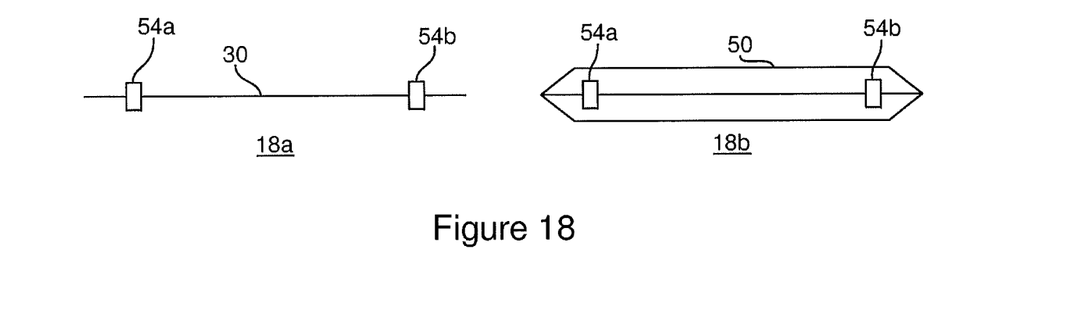
FIGS. 18a and 18b are schematic views according to an xOy plane of wired or surface parasitic elements comprising localized elements according to one embodiment of the invention.

FIG. 18 brings together FIGS. 18a and 18b, showing, according to an xOy plane, two embodiments of the wired parasitic element 30 or the surface parasitic element 50 comprising at least one localized element, in this case two localized elements 54a and 54b, which can be resistive, capacitive (capacitor) or inductive (coil). These localized elements are widely referred to as a "load". The localized elements 54a, 54b can make it possible to reproduce the RLC resonance of the parasitic element 30 so as to have a reduced physical length (or reduced dimensions) of the parasitic element 30, but an equivalent electrical length.

The localized elements 54a, 54b also make it possible to establish open (or high impedance) circuits having specific operating frequencies and closed circuits having other operating frequencies on the parasitic elements 30, 50, thus making it possible to vary the resonance of the parasitic elements according to the operating frequency. These localized elements 54a, 54b thus generate multiple resonances by means of current traps.

According to the embodiments, the localized elements can also be used on the vertical parasitic elements and/or on the connectors of the parasitic elements.

Figure 19:
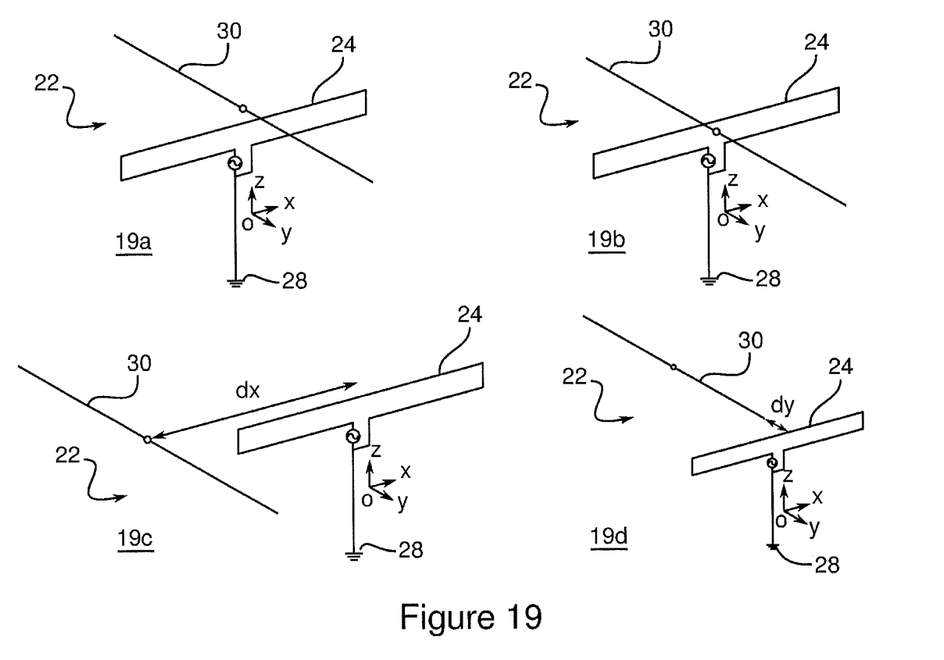
FIGS. 19a, 19b, 19c and 19d are schematic perspective views of antenna systems comprising a DAR antenna and a wired parasitic element according to various embodiments of the invention.

FIG. 19 brings together FIGS. 19a, 19b, 19c and 19d, showing perspective views of different embodiments of an antenna system 22 comprising an antenna 24 of the DAR kind, which antenna is connected to the conductive medium 28 (or to a ground plane if provided). The DAR antenna is made up of a loop extending in the xOz plane. A parasitic element 30 extends along the Oy axis, thus orthogonally to the DAR antenna, and in the vicinity of said DAR antenna. The various embodiments show various positions in which the parasitic element can be located.

In the embodiment in FIG. 19*a*, the parasitic element 30 is positioned above the DAR antenna.

In the embodiment in FIG. 19*b*, the parasitic element 30 is positioned below the maximum height of the DAR antenna, i.e. in the middle of the loop (without being connected thereto).

In the embodiment in FIG. 19*c*, the parasitic element 30 is offset by a distance $d_x$ from the DAR antenna along the Ox axis. The distance $d_x$ is at most equivalent to $\lambda_0/2$.

In the embodiment in FIG. 19*d*, the parasitic element 30 is offset by a distance $d_y$ from the DAR antenna along the Oy axis. The distance $d_y$ is at most equivalent to $\lambda_0/2$.

According to other embodiments of the invention, the parasitic element can be offset in the xOy plane by combination of the distances $d_x$ and $d_y$.

Figure 20:
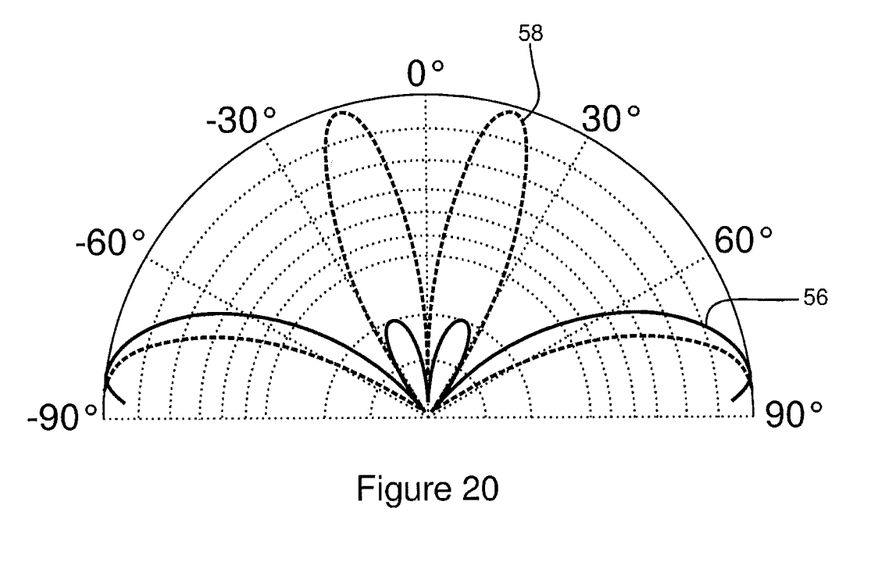

FIG. 20 shows a radiation pattern according to the xOz plane of an antenna system according to the embodiment shown in FIG. 19, for two wired parasitic element lengths.

The first curve 56 shows the radiation from the antenna system having a parasitic element of a length $L=\lambda_0$. The ionospheric radiation (between −45° and 45°) is low at this parasitic element length.

The second curve 58 shows the radiation from the antenna system having a parasitic element of a length $L=2\lambda_0$. The ionospheric radiation (angles between −45° and 45°) is high at this parasitic element length, but the directivity is greater in the region of the surface waves (angles close to −90° or 90°).

Adjusting the length of the parasitic element between these two lengths thus make it possible to achieve intermediate results according to the application sought for the antenna system, favoring either the reduction of ionospheric radiation or the directivity in the region of the surface waves.

The invention is not restricted only to the described embodiments. In particular, the features of the described embodiments can be combined to form other embodiments; the number and arrangement of the antennas, parasitic elements and parasitic elements can vary in order to obtain an antenna system which is the most suitable for the desired operation.

The invention claimed is:

1. Antenna system for low-frequency, medium-frequency or high-frequency surface waves, comprising:
    at least one antenna which is electrically short in the vertical plane, has vertical or elliptical polarization and emits radiation at an operating frequency of between 30 kHz and 30 MHz, said at least one antenna being connected to an imperfect conductive medium comprising earth or water and a substantially horizontal surface,
    at least one wired parasitic element that is electrically insulated from each of said at least one antenna and arranged in the vicinity of said at least one antenna so as to be able to radiate by virtue of the current induced by said radiation from said at least one antenna, said at least one wired parasitic element extending in a direction forming an angle between −0.10° and 10° with the surface of the imperfect conductive medium;
    wherein at least two wired parasitic elements extend in main directions that are different from one another, said at least two wired parasitic elements being placed above and separated from said at least one antenna, and
    the antenna system further comprises at least one vertical parasitic element extending in a direction that is substantially perpendicular to the surface of the imperfect conductive medium, said at least one vertical parasitic element being connected to the imperfect conductive medium and is arranged in the vicinity of at least one antenna, so as to be able to radiate by virtue of the current induced by said radiation from said at least one antenna;
    said wired parasitic elements and said at least one vertical parasitic elements being adapted to radiate such that the antenna system transmits surface waves with reduced ionospheric radiation and increased directivity.

2. Antenna system according to claim 1, wherein at least two wired parasitic elements are electrically connected.

3. Antenna system according to claim 1, wherein at least one vertical parasitic element comprises at least one localized element.

4. Antenna system according to claim 1, wherein the imperfect conductive medium further comprises a ground plane to which each antenna is connected.

5. Antenna system according to claim 4, wherein at least one wired parasitic element is connected to the ground plane.

6. Antenna system according to claim 1, wherein at least one wired parasitic element is connected to the imperfect conductive medium.

7. Antenna system according to claim 1, wherein at least one wired parasitic element comprises at least one folded portion.

8. Antenna system according to claim 1, wherein at least one wired parasitic element comprises at least one localized element.

9. Antenna system according to claim 1, further comprising a plurality of wired parasitic elements that are connected to form a surface parasitic element or a volumetric parasitic element.

* * * * *